(12) United States Patent
Leung et al.

(10) Patent No.: US 7,089,001 B2
(45) Date of Patent: Aug. 8, 2006

(54) MOBILE COMMUNICATIONS

(75) Inventors: Edward Yan Tao Leung, Hong Kong (HK); Richard Midgett, Hong Kong (HK); Kwok Wing Yau, Hong Kong (HK)

(73) Assignee: Hong Kong CSL Limited, Hong Kong (HK)

( * ) Notice: Subject to any disclaimer, the term of this patent is extended or adjusted under 35 U.S.C. 154(b) by 293 days.

(21) Appl. No.: 09/980,949

(22) PCT Filed: Sep. 11, 2001

(86) PCT No.: PCT/IB01/01867

§ 371 (c)(1),
(2), (4) Date: Apr. 22, 2002

(87) PCT Pub. No.: WO02/21861

PCT Pub. Date: Mar. 14, 2002

(65) Prior Publication Data

US 2002/0147012 A1    Oct. 10, 2002

(30) Foreign Application Priority Data

Sep. 11, 2000    (GB)    ................................ 0022205.9

(51) Int. Cl.
*H04Q 7/20*    (2006.01)

(52) U.S. Cl. .................. 455/433; 455/458; 455/432.1; 455/435.1; 455/456.1; 455/434

(58) Field of Classification Search ................ 455/433, 455/558, 432.1–3, 434, 551, 552.1, 435.1–3, 455/456.1

See application file for complete search history.

(56) References Cited

U.S. PATENT DOCUMENTS

| | | | | |
|---|---|---|---|---|
| 5,442,806 | A | * | 8/1995 | Barber et al. ............. 455/435.2 |
| 5,903,832 | A | * | 5/1999 | Seppanen et al. ......... 455/435.3 |
| 5,950,130 | A | * | 9/1999 | Coursey ................... 455/432.1 |
| 5,974,328 | A | * | 10/1999 | Lee et al. ................. 455/456.3 |
| 5,999,811 | A | * | 12/1999 | Molne ...................... 455/432.3 |
| 6,006,094 | A | * | 12/1999 | Lee ............................. 455/445 |
| 6,047,180 | A | * | 4/2000 | Coutant ...................... 455/434 |
| 6,085,085 | A | * | 7/2000 | Blakeney et al. ......... 455/426.1 |
| 6,185,423 | B1 | * | 2/2001 | Brown et al. ............... 455/434 |
| 6,216,014 | B1 | * | 4/2001 | Proust et al. ............... 455/558 |

(Continued)

FOREIGN PATENT DOCUMENTS

EP    0781064 A    6/1997

(Continued)

OTHER PUBLICATIONS

Technical Specification Group Series & Series Aspects, Meeting 7, Madrid Spain (Mar. 15-17, 2002). pp. 7, 8, 9.

*Primary Examiner*—George Eng
*Assistant Examiner*—Sharad Rampuria
(74) *Attorney, Agent, or Firm*—Jackson Walker, LLP

(57) ABSTRACT

A method of automatically establishing a roaming service for a mobile telephone, that includes a pre-programmed SIM card, performs a Location Update in the following order.
1. Registered Public Land Mobile Network ("RPLMN"), i.e. the last registered network as stored in the SIM directory $EF_{LOCI}$ (EF6F7E).
2. Home PLMN ("HPLMN")
3. PLMNs contained in a "PLMN Selector" data field based on the "Operator List".
4. User-defined preferred PLMN
5. Other PLMNs with received signal level above a predetermined strength in random order; and
6. All other PLMNs in order of descending signal strength.

9 Claims, 5 Drawing Sheets

U.S. PATENT DOCUMENTS

| | | | |
|---|---|---|---|
| 6,295,454 B1 * | 9/2001 | Havinis et al. | 455/456.3 |
| 6,324,400 B1 * | 11/2001 | Shah et al. | 455/434 |
| 6,370,374 B1 * | 4/2002 | Eichinger et al. | 455/411 |
| 6,387,027 B1 * | 5/2002 | Bodin | 455/419 |
| 6,400,948 B1 * | 6/2002 | Hardin | 455/434 |
| 6,466,804 B1 * | 10/2002 | Pecen et al. | 455/558 |
| 6,546,246 B1 * | 4/2003 | Bridges et al. | 455/432.1 |
| 6,564,055 B1 * | 5/2003 | Hronek | 455/433 |
| 6,591,116 B1 * | 7/2003 | Laurila et al. | 455/558 |
| 6,625,451 B1 * | 9/2003 | La Medica et al. | 455/434 |
| 6,708,033 B1 * | 3/2004 | Linkola et al. | 455/440 |
| 6,745,029 B1 * | 6/2004 | Lahtinen et al. | 455/432.1 |
| 6,766,167 B1 * | 7/2004 | Tung et al. | 455/432.1 |
| 2002/0082049 A1 * | 6/2002 | Prise | 455/558 |

FOREIGN PATENT DOCUMENTS

| | | |
|---|---|---|
| FR | 2808645 A | 11/2001 |
| WO | WO 97/30561 | 8/1997 |
| WO | 9940746 A | 8/1999 |

* cited by examiner

MOBILE COMMUNICATIONS

The invention relates to mobile communications.

Global System for Mobile Communications ("GSM") is a technology widely adopted by mobile equipment operators throughout the world. To facilitate GSM automatic international roaming service, a set of guidelines exists so that when two GSM network operators wish to establish a roaming service, they have to establish a bilateral roaming agreement, followed by the technical and billing tests. With an automatic roaming service, mobile users do not need to change the Mobile Equipment ("ME") and the Subscriber Identity Module ("SIM"). Mobile users can make and receive calls in a visited network as if they are in a home network by using the roaming service.

Before a mobile user can use a mobile service in a visited network, the mobile user has to successfully register with the mobile service in the visited network. The procedure is called Location Update. If the home network has established a roaming service with more than one mobile operator in a same visited region, mobile users can either manually select one of the operators in the visited region, or use an auto-selection mode to perform the Location Update. According to the GSM Technical Specification 02.11, the Mobile Station ("MS") which is comprised of ME and SIM shall perform the Location Update in the following order when the auto-selection mode is used:
1. Registered Public Land Mobile Network ("RPLMN"), i.e. the last registered network as stored in the SIM directory $EF_{LOCI}$ (EF6F7E)
2. Home PLMN ("HPLMN")
3. PLMNs contained in the "PLMN Selector" (EF6F30) data field in the SIM (in priority order);
4. Other PLMNs with received signal level above a pre-determined value specified in the GSM specification in random order;
5. All other PLMNs in order of descending signal strength In this order, only the "PLMN Selector" (EF6F30) will allow users to enter the preferred roaming networks. According to the GSM Technical Specification 11.11, this list is readable and can be updated by mobile users through ME.

With the introduction of Inter-Operator Tariff (IOT) by the GSM. Association, network operators can negotiate with their roaming partners for a more flexible tariff. In addition, there is an increasing demand from customers for auto-selecting a better quality roaming network, and the need to prevent preferred network from writing onto the Forbidden PLMN (FPLMN) list as a result of transient signaling fault, unsuccessful Location Update in previous registration and so on. This follows that one roaming network operator is preferred to another, based on service quality, customer services and commercial consideration. However, the existing procedure does not provide network operators with any flexibility to control the order of mobile networks in the Location Update procedure.

It is an object of the invention to enable a network operator to derive a mechanism to ensure a preferred roaming network is selected with a chosen or flexible priority.

According to a first aspect of the invention there is provided a mobile telephone arranged to automatically re-establish roaming service with a network based on an "Operator List" by modifying the Registered Public Land Mobile Network ("RPLMN") during Location Update, through the use of a pre-programmed SIM card According to a second aspect of the invention, there is provided a method of automatically establishing a roaming service for a mobile telephone, including using a pre-programmed SIM card such that the preferred networks are selected in preference to others. Subsequently, although the Location Update is performed in the same order as before, the networks list being accessed is modified and the mechanism is described as follows:-
1. Registered Public Land Mobile Network ("RPLMN"), i.e. the last registered network as stored in the SIM directory $EF_{LOCI}$ (EF6F7E).
2. Home PLMN ("HPLMN");
3. PLMN contained in a "PLMN Selector" data field based on the "Operator List"
4. User-defined preferred PLMN;
5. Other PLMNs with received signal level above a pre-determined strength in random order; and All other PLMNs in order of descending signal strength.

In an embodiment of the invention an "Operator List" with preferred roaming networks set by the home network operator is created and built into the SIM. This list can be updated by the home network operator by means of data download over the air. Examples of updating the home network operator are as follows:-
   Over the air: Normal Short Message Services ("SMS")
   Over the air: SIM Application Toolkit ("SAT") data download by SMS
   Over the air: data download by Unstructured Supplementary Service Data ("USSD")
   Over the air: SAT data download by Wireless Application Protocol ("WAP")
   Using SIM editor at services centers/shops
   Making use of Mobile Station Application Execution Environment ("MExE") platform between SIM application and Services Server application, download operator list data by the common circuit switch bearers (e.g. circuit switch 9.6 kbps data) and packet switch bearers (e.g. packet switch based General Packet Radio Service ("GPRS") data)

During Location Update in auto-selection mode, MS will compare the RPLMN with the "Operator List". If the Mobile Country Code ("MCC") of the RPLMN is found in the "Operator List", the first available preferred network with the same MCC will replace that in RPLMN so that the MS searches and attempts to register to this network.

In addition, the "Operator List" will be copied to the PLMN Selector (EF6F30) and referenced by the MS during Location Update. The copying of "Operator List" over PLMN Selector (EF6F30) can be a direct copy or replaced by an indexed pre-stored list. If mobile users have entered preferred networks in PLMN Selector (EF6F30), the user-defined networks will be appended at the end, provided that there is free entry available. Thus, in auto-selection mode, the normal order of selection is unchanged, but the content of the network list is modified. As a result, the process is changed to:-
1. Registered Public Land Mobile Network ("RPLMN") with reference to "Operator List";
2. Home PLMN ("HPLMN");
3. PLMN as listed in the "Operator List" in the PLMN selector (EF6F30). The entries of the "Operator list" are stored in a specific location on the SIM e.g. EF6D30;
4. User-defined preferred PLMNs in the PLMN Selector (EF6F30). These user-defined preferred PLMNs have lower priority than those PLMNs of the "Operator List" in the PLMN Selector (EF6F30)as they are appended after the "Operator List"
5. Other PLMNs with received signal level above a pre-determined value specified in the GSM specification in random order; and 6. All other PLMNs in order of descending signal strength Manual selection mode by the user is not affected. Mobile users can still override the auto-selection by selecting a particular network manually. A new capability can be provided to allow the home network operator flexibility to restore partly or wholly the order of Location Update procedure through data download over the air.

A roaming service for mobile operators according to the invention will now be described by way of example with reference to the accompanying drawings in which:-

Figure 1:
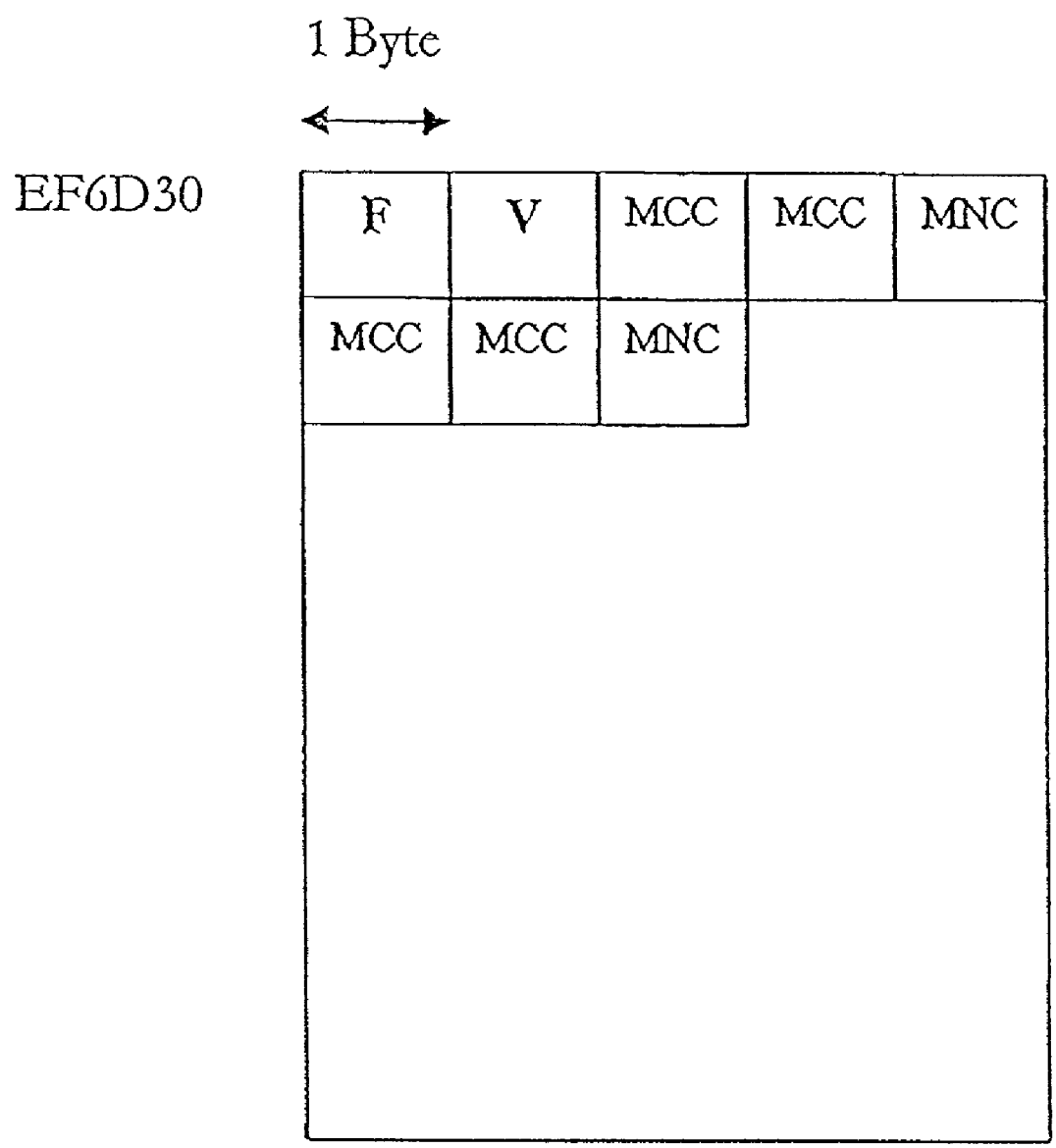
FIG. 1 illustrates a data structure of the "Operator List"

A new list "Operator List" is created and built in the Elementary File ("EF") in a SIM. The address of the "Operator List" is arbitrary and defined by a home operator in SIM production. In this example, the address EF6D30 is used. FIG. 1 shows the data structure of this "Operator List". The size, X, of the "Operator List" can be varied. However, it must be the same as a PLMN Selector (EF6F30). According to a GSM Technical Specification, EF6F30 must contain at least 8 network entries in the format of MCC and Mobile Network Code ("MNC"). For each network entry, it will take up 3 bytes. Therefore, the minimum size of the EF6D30 is 26 bytes including the header bytes F and V. It is however recommended to have a maximum of X less than 255 bytes since each file transfer from SIM to ME is in steps of 255 bytes for EF type. The header byte V indicates the number of valid network entries in the "Operator List". The header byte F is a flag with 4 possible values: If "F"=0, OTA update is not performed. (See FIG. 4 for further explanation). Mask to Mask comparison (See FIG. 2 for further explanation) between "Operator List"(EF6D30) and PLMN Selector (EF6F30) is required at power on stage. Examples of other comparison methods are as follows:

Mask to Mask comparison between the "Operator List" (EF6D30) and the PLMN Selector (EF6F30) and the "Operator List" has higher priority than the user-defined PLMNs. The user-defined PLMNs are then appended at the end of the "Operator List" when copying onto PLMN Selector (EF6F30), provided that there is available memory spaces in the PLMN Selector (EF6F30).

Entry to Entry comparison between the "Operator List" (EF6D30) and the PLMN Selector (EF6F30) and the "Operator List" has higher priority than the user-defined PLMNs. In this case, the redundant entries are eliminated Entry to Entry comparison between the "Operator List" (EF6D30) and the PLMN Selector (EF6F30). Any redundant entries are eliminated. The priorities of the entries are determined by a analyzing the history of individual roaming behaviour. This is to maximise the opportunity for ME to take an entry into usage, assuming that the mobile equipment is able to process entries in EF6F30 up to a certain limited length.

If "F"=1, OTA data download has been performed. At power on stage, when ME performs a Read binary on EF6F30, no Mask to Mask comparison between EF6D30 and EF6F30 is required. If "F"=2, only the $EF_{LOCI}$ Update Enhancement (See FIG. 3 for further explanation) is performed. If "F"=3, the enhancements mentioned in this description will be disabled and the normal order of Location Update is performed.

Figure 2:
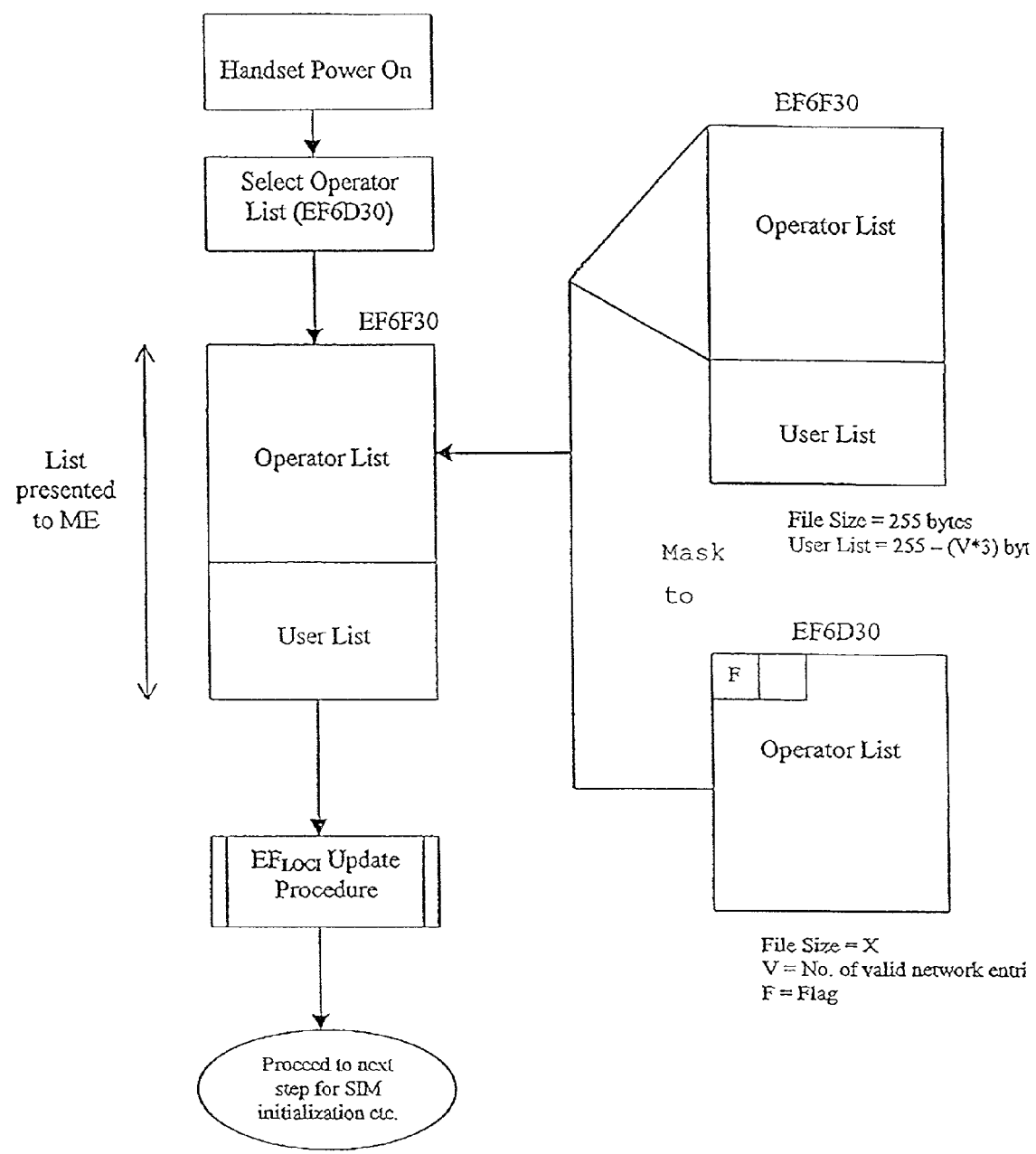
FIG. 2 illustrates a flow at the initial power on stage.

FIG. 2 illustrates the sequence at the initial power on stage. The value F in EF6D30 is checked at the power on stage. If "F"=0, a Mask to Mask comparison between EF6D30, which has "V" valid network entries, and the first "V"entries of EF6F30 is performed. The resulting difference, i.e. network entries in EF6F30 that are not mapped in Mask to Mask comparison are identified. Afterwards, the content of "Operator List" (EF6D30) is copied onto EF6F30, followed by the difference. When searching for preferred networks, the ME is based on the new preferred networks in EF6F30 and the operator defined networks will be searched first.

Any subsequent update on the PLMN Selector (EF6F30) by mobile users through Man Machine Interface ("MMI") is written on the EF6F30 as in a normal operation. However, the update only lasts for the session the MS is on. In the next power on, the Mask to Mask comparison is performed as described earlier. The resulting different network entries are then appended after the "Operator List" to PLMN Selector (EF6F30). Thus, the PLMN Selector (EF6F30) in ME's memory becomes the "Operator List" followed by user defined list immediately after power on. Examples of the triggering method include the following:-

Power ON-OFF to trigger the LOCI and PLMN enhancement (the current implementation)

Figure 3:
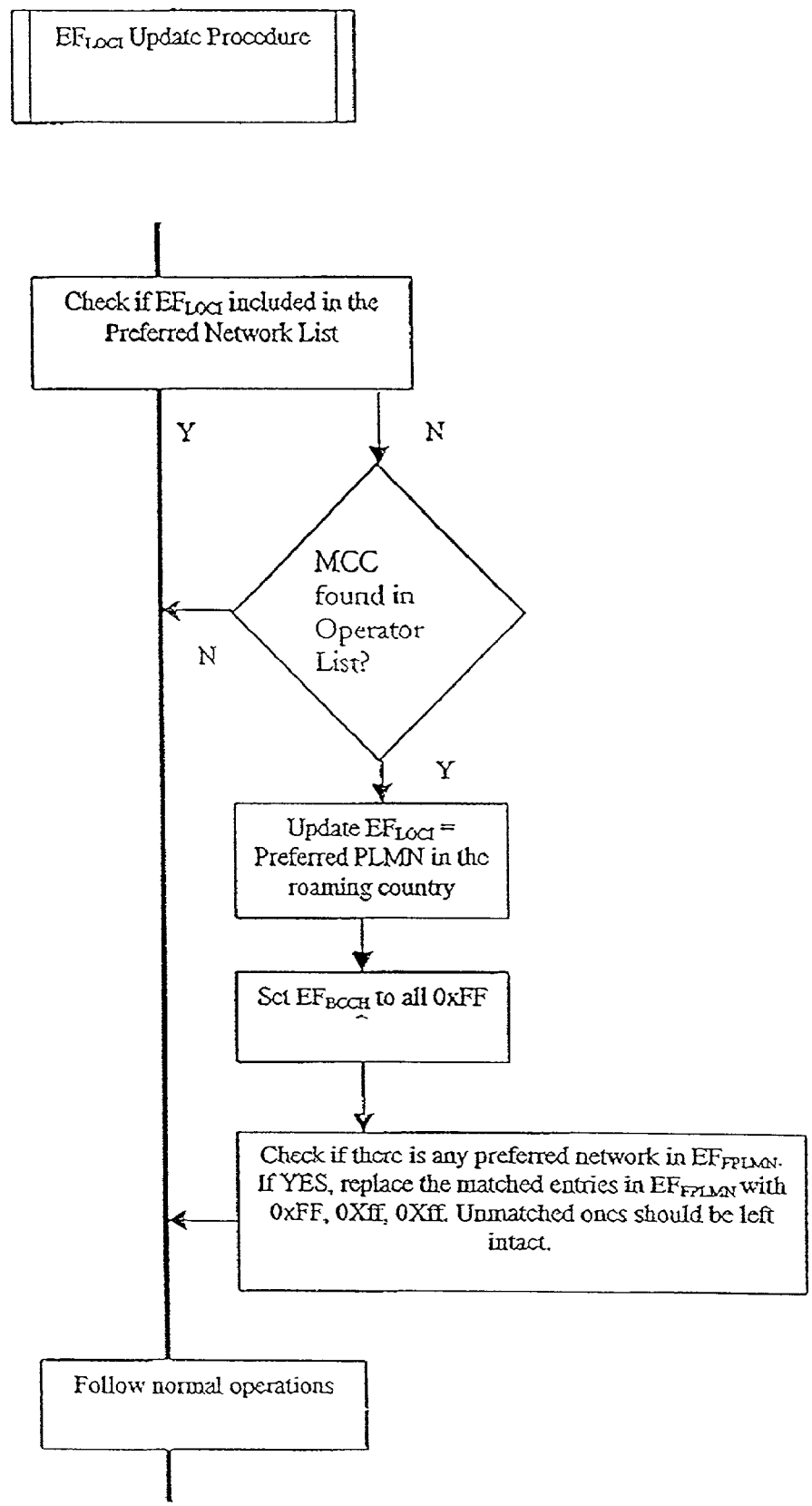
FIG. 3 illustrates an $EF_{LOCI}$ Update Enhancement.

$1^{st}$ reading attempt on Location Information ("LOCI") after power reset on SIM triggers the LOCI enhancement $1^{st}$ reading attempt on EF6F30 after power reset on SIM triggers the PLMN enhancement Any time when the SAT detects a change of MCC of RPLMN (i.e. roaming in other countries) and a subsequent re-read of EF6F30 is issued to the mobile equipment FIG. 3 illustrates the $EF_{LOCI}$ Update Enhancement. In accordance with the GSM Technical Specification, the Registered Network (RPLMN) as listed in $EF_{LOCI}$ is searched first in auto-selection mode. After the Mask to Mask comparison, $EF_{LOCI}$ is checked against the Operator List (EF6D30). If the current value of $EF_{LOCI}$ is already in EF6D30, no modification on the $EF_{LOCI}$ is required. Otherwise, the MCC of $EF_{LOCI}$ is checked against that in EF6D30. If there is a match, the MNC of the first matched network in EF6D30 replaces the MNC in $EF_{LOCI}$. In addition, the value in $EF_{LOCI}$ is reset. The ME is based on the modified $EF_{LOCI}$ to search for the Registered Network (RPLMN).

Figure 4:
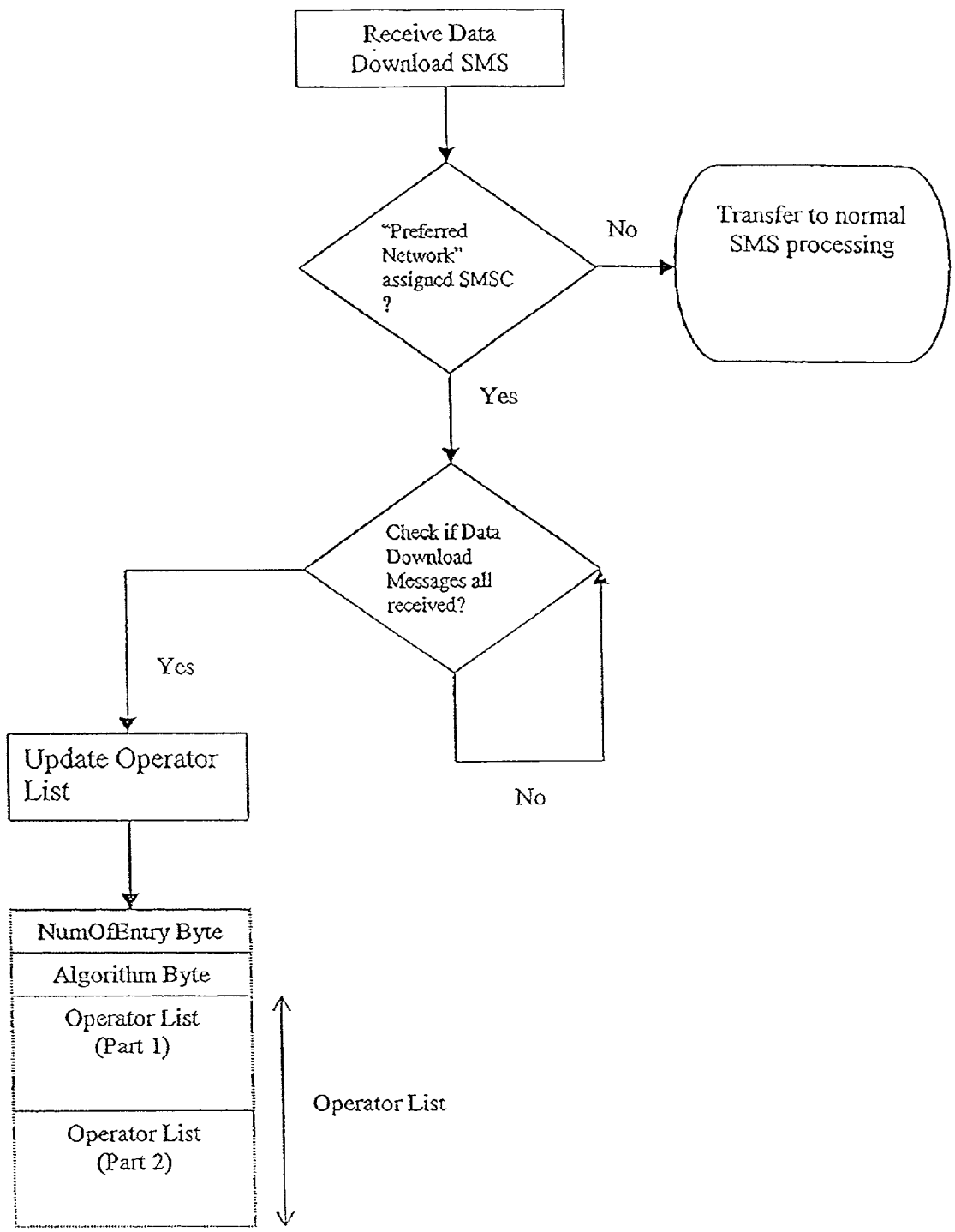
FIG. 4 illustrates the mechanism of Over The Air ("OTA") data download.

FIG. 4 illustrates the mechanism of OTA data download. A home network operator can update the "Operator List" by means of short message data download. The list of roaming operators in the format of MCC and MNC forms a short message content. The header bytes "NumOfEntry" and "Algorithm" indicates the number of preferred network entries and the choice of algorithm to be used. There are three possible algorithms:-

1. The operator-defined preferred roaming networks and the $EF_{LOCI}$ update enhancement is used;
2. Only the $EF_{LOCI}$ update enhancement is used; and
3. Neither the operator-defined preferred roaming network nor the $EF_{LOCI}$ update enhancement is used, i.e. the original order of Location Update procedure is recovered.

In addition, due to the possible size limitation of the short message, more than 1 short message may be used in the data download. Thus, a byte is used to indicate the session number for the data download in the short message. To avoid hacking, security measures are implemented. The Transfer Layer Protocol-Originating-Address ("TO-OA") used to send the short message must be matched with one defined in the SIM during production stage. In addition, the content of the short message, excluding the "NumOfEntry" byte and "Algorithm" byte are calculated for checksum. A simple approach is to sum the Exclusive OR ("XOR") results of two bytes pair. Other examples of possible security enhancements include:-

Figure 5:
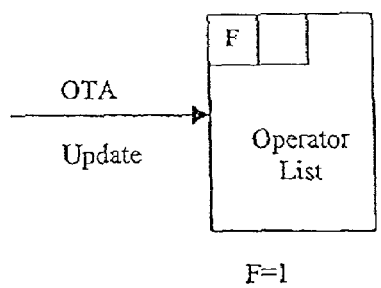
FIG. 5 illustrates the mechanism to handle the OTA data download in a SIM card.
Figure 5:
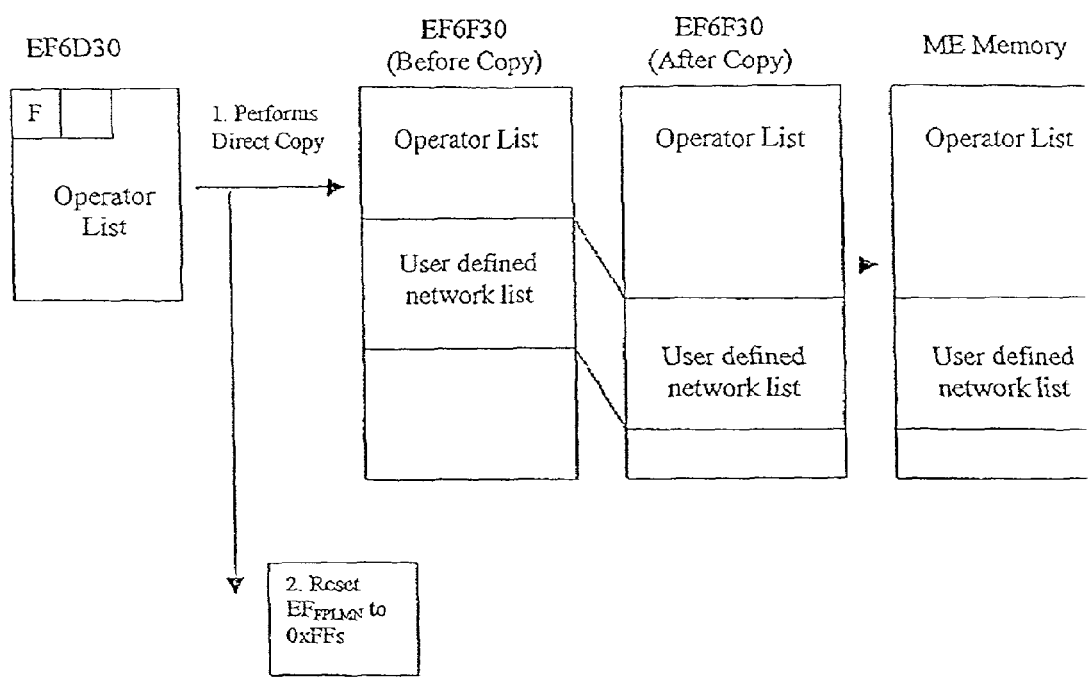

Content check sum plus checking of TP-OA
Check sum algorithm based on Ki (the secret key shared between the SIM and the network) of the SIM or International Mobile Subscriber Identity ("IMSI") of the SIM
Interactive authentication via call or supplementary services ("SS") or SMS by SAT application FIG. 5 illustrates the mechanism to handle the OTA data download in a SIM card. The short message received via OTA download triggers the resident script built in SIM card to update the flag to F=1, and the content of EF6D30 is then updated accordingly. An acknowledgement short message will be sent back to a pre-defined address. Upon the next power up, a step translation will be performed in EF6F30 to offset the user defined network list to a correct offset so that the user defined network list is not overwritten in the case that the updated "Operator List" is longer than previous one. On the other hand, if the new "Operator List" is shorter than the previous one, the difference is removed. Then the new content of EF6D30 is copied to EF6F30 and placed before the user defined network list. The flag "F" is then reset to 0.

Embodiments enable automatic selection of the technically and quality-wise best network available for the user. The selection can also be automatically "biased" to enable the cheapest available network for each user according to users' or mobile services provider's specific commercial arrangement. A services provider is also able to remotely assist a roaming customer by up-dates transmitted to alter data in the SIM card. Normally only 8 to 16 entries are available and so a user-defined or operator defined short list of networks can be sent actively to the user depending upon the mobile telephone customers geographical habits.

Enhancements of the described roaming service can include the following:-

Network entries which are in the operator list are removed from a Forbidden list after the triggering "after power ON/OFF"
Operator list based on Location Update Message received from the foreign (visited) network from our individual customers is optimised to avoid the mobile equipment limited ability in handling long PLMN selectors (EF6F30).

The invention claimed is:

1. A method of automatically establishing a roaming service for a mobile telephone having a public land mobile network (PLNMN) selector data field, including using a pre-programmed subscriber identity module having an operator list of preferred public land mobile networks to modify the PLMN selector data field to include the preferred public land mobile networks such that a network update procedure is performed in the following logical order:
   1. registered public land mobile network,
   2. home public land mobile network,
   3. the preferred public land mobile networks contained in a PLMN Selector data field,
   4. user-defined public land mobile networks,
   5. other public land mobile networks with received signal level above a predetermined strength in random order, and
   6. all other public land mobile networks in order of descending signal strength.

2. A method according to claim 1 in which the operator list is reserved in a fixed but implementation-dependent memory location in the subscriber identity module.

3. A method according to claim 1, in which the preferred public land mobile networks are copied to the PLMN Selector data field, the preferred public land mobile networks taking precedence over user-defined-public land mobile networks which are appended at the end of the operator list in the PLMN selector.

4. A method according to claim 1 wherein during network selection the country code of the RPLMN is compared with networks defined in the operator list the most preferred network with the country code replacing the RPLMN.

5. A Subscriber Identity Module, for a mobile telephone, having an operator list of preferred public land mobile networks and pre-programmed to, at power on of the mobile telephone, automatically re-establish roaming service with a network based on the operator list by modifying a registered public land mobile network of the mobile telephone during a location update procedure, wherein a country code of the registered public land mobile network is compared with networks defined in the operator list and the most preferred network with the same country code replaces the registered public land mobile network.

6. A Subscriber Identity Module according to claim 5 in which the operator list is reserved in a fixed but implementation-dependent memory location in the subscriber identity module.

7. A Subscriber Identity Module according to claim 5, in which the preferred public land mobile networks are copied on to the PLMN Selector, the preferred public land mobile networks taking precedence over user-defined public land mobile networks which are appended at the end of the operator list in the PLMN selector.

8. A Subscriber Identity Module for a mobile telephone, having an operator list of preferred public land mobile networks and pre-programmed to, in use, modify public land mobile network (PLMN) selector data of the telephone to include the preferred public land mobile networks from the operator list such that a location update is preformed in the following logical order:
   1. registered public land mobile network,
   2. home public land mobile network,
   3. registered public land mobile networks contained in the PLMN Selector data field based on the operator list,
   4. user-defined public land mobile networks,
   5. other-public land mobile networks with received signal level above a predetermined strength in random order, and
   6. all other public land mobile networks in order of descending signal strength.

9. A Subscriber Identity Module according to claim 8, in which the preferred public land mobile networks are copied on to the PLMN Selector, the preferred public land mobile networks taking precedence over user-defined public land mobile networks which are appended at the end of the operator list in the PLMN selector.

* * * * *